Nov. 13, 1951  J. D. WILLIAMS  2,574,855
INDUCTION HARDENING OF WAYS OF MACHINE TOOLS
Filed July 17, 1948  4 Sheets-Sheet 1

INVENTOR.
JAMES D. WILLIAMS
BY Hudson, Boughton,
Williams, David & Hoffmann.
ATTORNEYS

Fig. 10

Patented Nov. 13, 1951

2,574,855

UNITED STATES PATENT OFFICE 2,574,855

INDUCTION HARDENING OF WAYS OF MACHINE TOOLS

James D. Williams, Cleveland, Ohio, assignor to The Warner & Swasey Company, Cleveland, Ohio, a corporation of Ohio Application July 17, 1948, Serial No. 39,234

1 Claim. (Cl. 219—47)

This invention relates to an apparatus for hardening the ways of a machine tool and, more particularly, to an improved apparatus for induction heating the surfaces of the ways of a machine tool to a hardening temperature and immediately thereafter quenching the heated surfaces to thereby harden the latter.

In a machine tool, such as a lathe or the like, the movable slide or slides thereof are supported upon ways which are customarily cast integral with the bed of the machine. These ways may have hardened surfaces to reduce the wear thereof, which wear would adversely effect the accuracy of the work machined. Heretofore, the ways have been hardened by employing flame-type burners which are progressed over the ways to heat the latter, the heated ways then being quenched. This mode of hardening the ways has not been entirely satisfactory since heating the surfaces of the ways to a hardening temperature by means of a flame is relatively slow and results in a heating of the interiors of the ways to an appreciable extent. The heat which is absorbed by the interiors of the ways is wasted since it serves no useful purpose and, moreover, this interior heating tends to introduce stresses and/or distortions in the ways. Furthermore, such interior heating renders it difficult to accurately control the depth of hardening of the ways. In addition, it is difficult to maintain the size and heating effect of the flame constant so that the heating of the ways, and hence the hardening, is frequently not uniform and burning of the surfaces is not uncommon.

The principal object of this invention is, therefore, to provide an improved apparatus for hardening the way or ways of a machine tool, which apparatus comprises means for induction heating those surfaces of the way or ways which are to be hardened and means to immediately thereafter quench the heated surfaces whereby the depth of the hardening is more uniform and is more accurately controlled, and the hardening is effected more rapidly and without appreciable heating of the interiors of the way or ways below the depth to which the material is to be hardened.

Another object of the invention is to provide an improved apparatus for hardening integral ways on the bed of a machine tool, which apparatus comprises an induction-type heater adapted to substantially straddle the surfaces of a way to be hardened and to be supplied with alternating current of a relatively high frequency to thereby heat the surfaces of the way, a means for producing relative longitudinal movement between the heater and the way to thereby progressively heat the surfaces of the way to the hardening temperature, and means for progressively applying a quenching medium to the heated portions of the way.

A further object of the invention is to provide an improved apparatus for hardening the ways of a machine tool of the type mentioned in the preceding object and in which the induction-type heater is adjustably supported adjacent the way or ways to be hardened so that the spaced relationship therebetween may be varied and thereby effect accurate control of the depth of hardening.

A still further object of the invention is the provision of an improved apparatus for hardening ways on the bed of a machine tool, which apparatus comprises an induction-type heater, means to produce relative longitudinal movement between the heater and the way to be hardened, means to control the speed of that movement and means to vary the electrical current supplied to the heater whereby the hardening may be accurately controlled.

An additional object of the invention is to provide an apparatus of the type mentioned in the preceding object and in which manually operated means are provided to terminate the relative movement between the inductor and the way at any point and automatic means are provided to terminate the relative movement after a predetermined length of the way has been hardened, a means also being provided to automatically interrupt the supply of electrical current to the inductor whenever the said relative movement has been terminated.

Another object of the invention is to provide an improved apparatus for hardening integral ways upon the bed of a machine tool, which apparatus comprises an induction-type heater adapted to be progressively moved along the way to be hardened to thereby raise the temperature of the surfaces of the way to a hardening temperature, and a quenching means mounted for movement with said heater and adapted to supply a quenching medium to the heated portion of the ways.

A further object of the invention is to provide an apparatus of the type mentioned in the preceding object and in which the said induction-type heater and the quenching means are shaped to substantially conform with the shape of the surfaces to be hardened and are supported adjacent the way or ways in a manner such that the said heater and quenching means may be readily removed from the supporting means and replaced by induction heaters and quenching means of different configurations for effecting hardening of ways of other configurations.

A still further object of the invention is to provide an improved induction-type heater for heating integral ways of a machine tool to a hardening temperature.

The invention also has as its object the provision of an improved, combined induction-type heater and quencher for heating the ways of a machine tool to a hardening temperature and for quenching the heated surfaces substantially immediately thereafter.

The invention further resides in certain novel features of construction, and combination and arrangements of parts, and further objects and advantages thereof will be apparent to those skilled in the art to which it pertains from the following description of the present preferred embodiment, and one modification thereof, described with reference to the accompanying drawings in which similar reference characters represent corresponding parts in the several views and in which:

In accordance with this invention, hardening of the ways of a machine tool is effected by producing relative longitudinal movement between the ways and induction-type heaters, which are positioned closely adjacent the ways and supplied with relatively high frequency alternating current, thereby progressively heating the surfaces of the ways to a hardening temperature, the heated portions being quenched immediately after they have been heated. This relative longitudinal movement between the ways and the heating and quenching means may be effected in any desired manner by either moving the machine tool casting relative to the heating and quenching means or conversely. Therefore, while the apparatus in its preferred form is hereinafter described as having the ways which are to be hardened moved relative to the heating and quenching means, it is to be understood that this is by way of illustration and not of limitation.

Figures 1, 9:
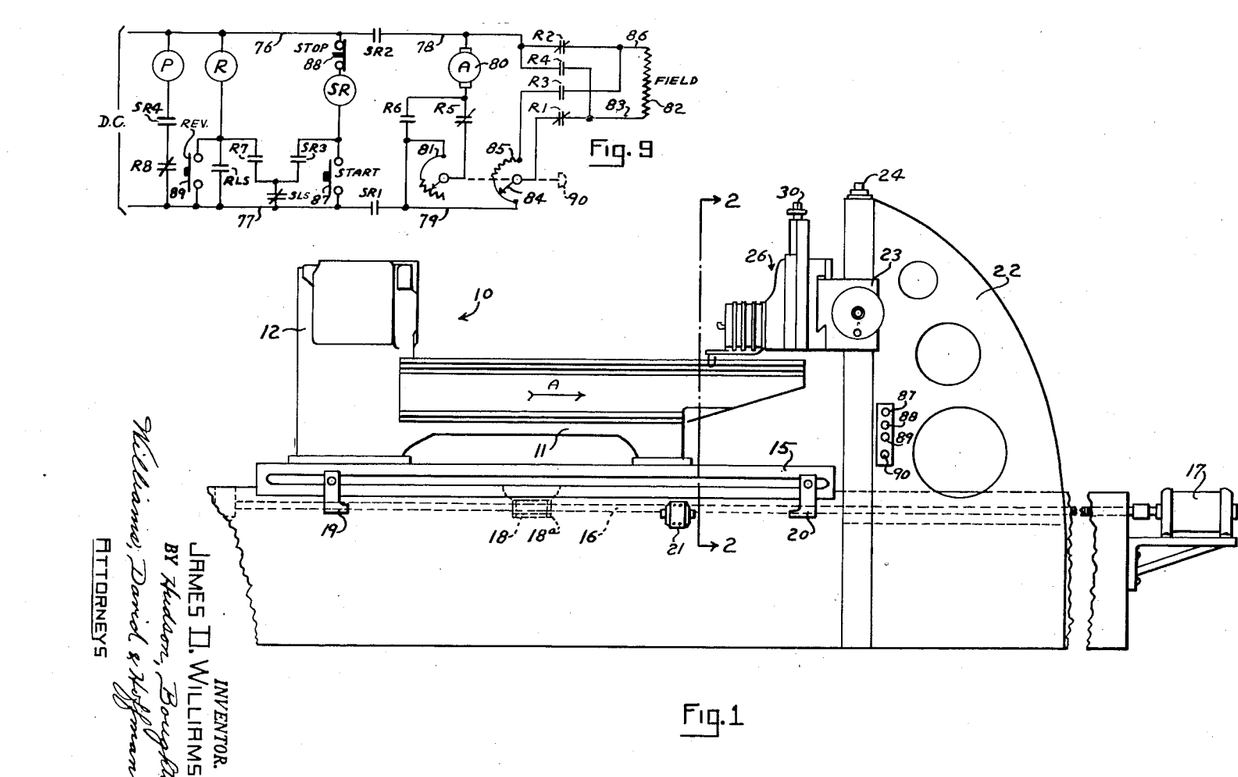
Fig. 1 is a side elevational view of an improved apparatus constructed in accordance with this invention and showing a machine tool bed casting in place in the apparatus for effecting the hardening of the integral ways of the bed.
Fig. 9 is a schematic, simplified cross-the-line wiring diagram of an electrical circuit for controlling the relative movement between the way or ways to be hardened and the combined heater and quencher and for simultaneously controlling the supply of electrical current to the inductor, the diagram employing the symbols for contacts and relays which have been adopted by the electrical industry; and, Fig. 10 is a wiring diagram of the electric circuit illustrated in Fig. 9 but redrawn to employ the symbols recognized by the Patent Office.

Referring first to Fig. 1 of the drawings, reference numeral 10 indicates generally a machine tool casting having the usual integral bed 11 and head stock 12, as is well known in the art. Such a casting also comprises integral, longitudinally extending ways 13 and 14 on the bed 11 for slidably supporting the slide or slides of the machine tool, and it is the slide supporting surfaces of these ways which are to be hardened. The bed of the casting 10 is shown as mounted upon a movable table 15 which is supported upon a suitable base, the table 15 being longitudinally movable by means of a traversing screw 16 which is driven by a reversible variable speed electric motor 17, the screw cooperating with a nut 18 carried by a depending boss or bracket 18a attached to the table 15. One side of the table 15 is provided with longitudinally adjustable stops 19 and 20 for cooperation with a reversing switch mechanism 21 to control the direction of rotation of the motor 17.

As will be readily understood, rotation of the motor 17 in one direction moves the table 15, and the machine tool casting 10 thereon, to the right as viewed in Fig. 1 until the adjustable stop 19 engages and actuates the switch mechanism 21 thereby reversing the direction of rotation of motor 17, the table then moving to the left and its movement in this direction being limited by engagement of the stop 20 with switch mechanism 21. As will hereinafter appear, movement of the table and the casting to the right is at a relatively slow feeding speed during which movement the ways are heated and quenched thereby effecting hardening. When the predetermined lengths of the ways have thus been hardened, the operation of the switch mechanism 21 by the stop 19 alters the circuit for the motor 17 so that the direction of rotation of the latter is reversed and it is operated at relatively high speed to effect a rapid return of the table 15 and casting back to the initial position. The operation of the switch mechanism 21 by the stop 20 again prepares the motor circuit for relatively slow rotation of the motor in the initial direction.

The mechanism, which includes the table 15, is similar in appearance to a planer and has a vertical standard 22 mounted upon the base. This standard is provided with a vertically movable cross rail 23, see Fig. 2, the elevation of which may be adjusted by the screws 24 and 25 in the same manner as the cross rail of a planer is adjusted. The cross rail 23 is provided with horizontally extending ways upon which supports, generally designated 26 and 27, may be horizontally moved to any desired position and locked in such positions by conventional means which need not be described in detail. The supports 26 and 27 include slide-supporting guide ways 28 and 29 in which vertically extending adjusting screws 30 and 31 are, respectively, rotatably supported but held from longitudinal movement. The lower ends of these screws 30 and 31 are threadably received in vertically movable slides 32 and 33 which are vertically slidable upon the guideways 28 and 29, respectively. The construction is such that rotation of the screws 30, 31 effects vertical adjustment of the slides 32, 33.

Figures 2, 3:
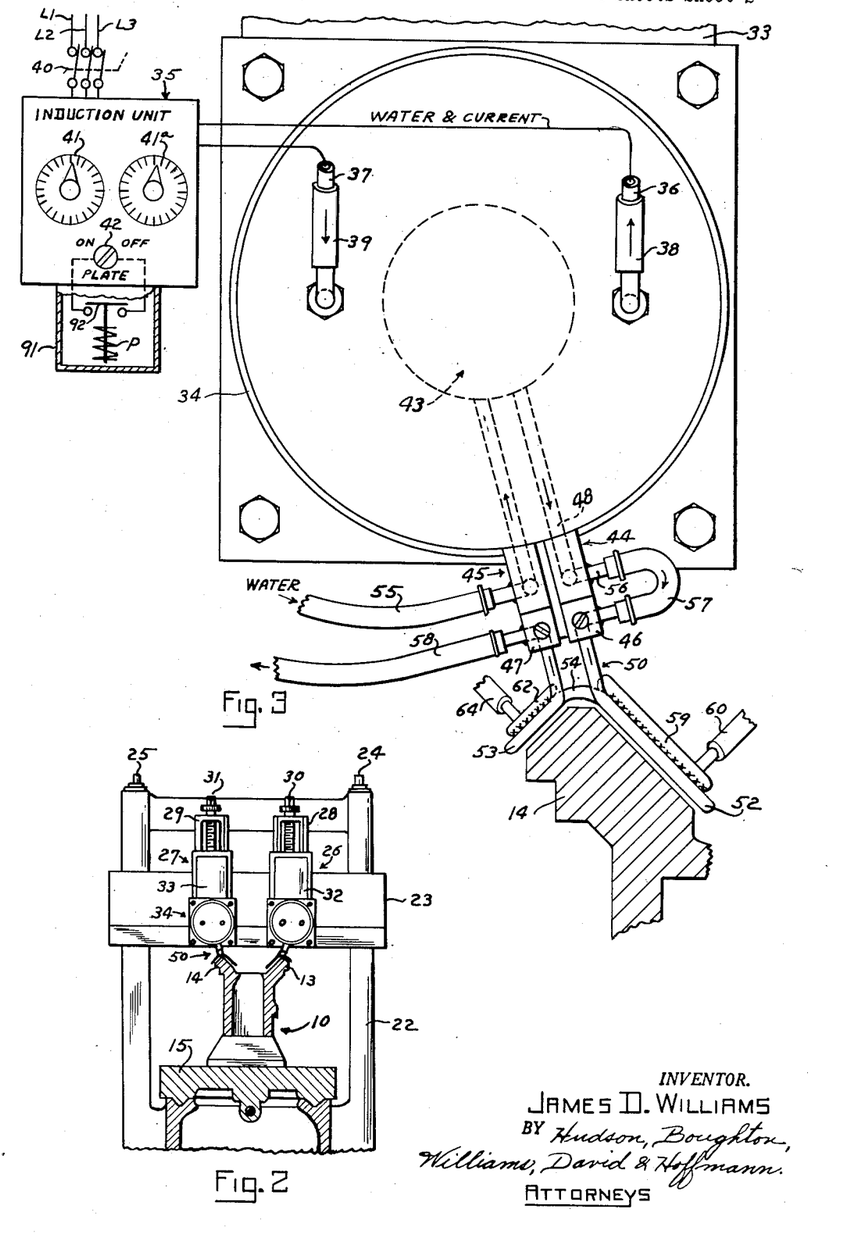
Fig. 2 is a sectional view taken substantially on the line 2—2 of Fig. 1 with certain parts omitted.
Fig. 3 is an enlarged fragmentary front view of one of the transformers, induction-type heaters and quenchers of the apparatus cooperating with one of the ways to be hardened, a fragment of the latter being shown in section.

Each of the vertically adjustable slides 32, 33 is provided with separate means for effecting induction heating and quenching of one of the ways of the casting 10. Since these means are substantially identical only one will be described in detail. As shown in Figs. 2 and 3, the vertically adjustable slide 33 of the support 27 has a high frequency, alternating current transformer 34 mounted thereon for movement therewith. The primary of this transformer is supplied with high frequency, alternating current from an induction unit, generally designated 35, the connections to the primary of the transformer being preferably made through hollow copper tubes 36 and 37 through which water or other fluid is circulated for cooling purposes. The tubes 36 and 37 are preferably insulated as indicated at 38 and 39.

The induction unit 35 is preferably of the electronic tube type and is supplied with alternating electric current from power leads L1, L2 and L3 which are connected to the unit 35 through a disconnect switch 40. Such units are made by a number of different companies and the details thereof can be readily determined from the trade literature so that it is not necessary to illustrate and describe the unit in detail. Suffice it to note that such a unit generally comprises a means, controlled by a knob 41 or the like, by which the frequency of the alternating current supplied by the unit may be varied. A second means, controlled by a knob 41a or the like, is also preferably provided for adjusting the value of the power output of the induction unit. In addition, the unit is conventionally provided with a "off-on" switch 42 in either the grid or the plate circuits of the output tube or tubes to terminate the supply of high frequency alternating current. This enables the output of the unit to be turned on or off at will without deenergizing the entire unit thus obviating the time lag required for the tubes to reach operating temperatures as would be the case if the output were controlled solely by the disconnect switch 40. In accordance with the invention, a relay operated switch is bridged about the manually operated switch 42, as hereinafter described, to control the output of the unit in accordance with the relative movement between the induction heaters and the ways being hardened. Aside from this additional switch, the unit 35 is, as mentioned above, of conventional construction and may, by way of example, be a 50 kilowatt General Electric "Electronic Heater," model 4F50A2.

The secondary of the transformer 34, generally designated 43, is formed by one or more turns of hollow copper tubing the ends of which are connected in bores in metallic bracket members, generally designated 44 and 45, which are supported by the transformer adjacent to but insulated from each other. The bracket members 44 and 45 are each provided with forwardly extending portions 46 and 47 which are longitudinally bored and communicate with the hollow interior of the hollow conductor 48 comprising the secondary 43, of the transformer.

Figures 4, 8:
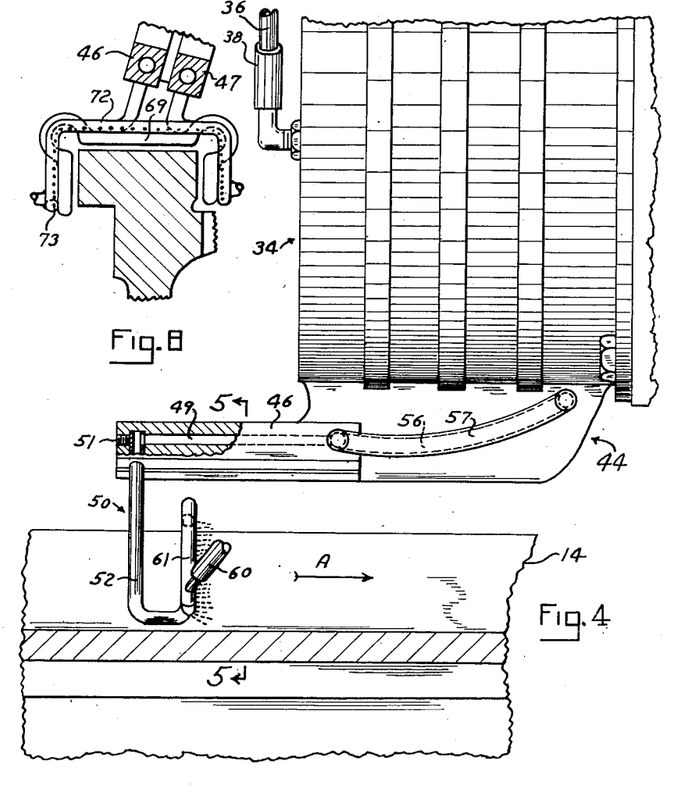
Fig. 4 is a fragmentary view, partly in section and partly in side elevation, of the portion of the apparatus shown in Fig. 3.
Fig. 8 is a fragmentary sectional view taken substantially on the section indicating line 8—8 of Fig. 7, looking in the direction indicated by the arrows and illustrating the rear of the heater and quencher shown in Fig. 6.
Figure 5:
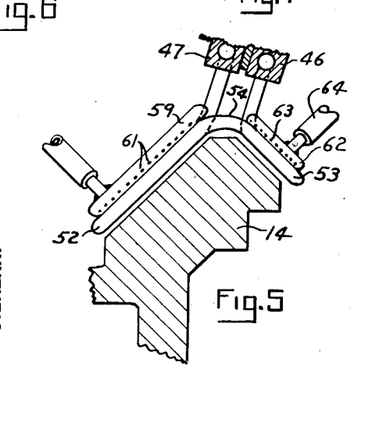
Fig. 5 is a fragmentary sectional view taken substantially on the section indicating line 5—5 of Fig. 4, looking in the direction indicated by the arrows and illustrating the rear of the heater and quencher.

The forwardly extending portions 46 and 47 of the bracket members 44, 45 are each provided with a transverse bore extending inwardly from the bottom thereof and communicating with a longitudinal bore such as 49, therethrough, see Fig. 4. The transversely extending bores each receive one of the end portions of a copper tube, which forms one of the induction heaters 50 of the apparatus. The end portions of this tube each have openings in the rear thereof cooperating with the longitudinal passageways or bores, such as 49, while the forward sides of the end portions of the tube are closed, the tube being held in the forward portions 46, 47 of the bracket members by set screws such as 51 which also serve to close and seal the ends of the longitudinal bores, the bracket members and set screws constituting clamp means for removably supporting the inductor tubes 50.

The induction heater or inductor 50, which is illustrated in Figs. 2 through 5, is designed for cooperation with a substantially V-shaped way 14 which is to be hardened. Therefore, the heater is provided with two substantially U-shaped portions 52 and 53, the planes of which are disposed at an angle with respect to each other and which angle corresponds substantially with the angle formed by the surfaces of the way to be hardened. These substantially U-shaped portions 52 and 53 are connected by an integral, intermediate portion such as 54 which extends over the top of the way as will be seen from the Figs. 3, 4, and 5.

The tube 48, forming the secondary of the transformer, the brackets 44, 45 and the tube forming the induction heater or inductor 50 have passageways therethrough in communication with each other to permit the circulation of cooling water or other fluid therethrough. Thus, cooling water or other fluid is supplied through a conduit 55 connected to a bore in the rear portion of the bracket member 45, which bore in turn communicates with one end of the tube 48 constituting the secondary of the transformer.

The other end of the tube 48 communicates with a bore in the rear portion of the bracket member 44 and this bore is connected to the longitudinal bore 49 in the forwardly extending portion 46 of this bracket member by a connecting tube 56 which is preferably provided with insulation 57. The inductor 50 communicates with the bore 49 and with a similar bore in the forwardly extending portion 47 of the bracket member 45 and the latter, in turn, communicates with an exhaust conduit 58. Consequently, the secondary of the transformer and the induction heater are continuously cooled by water or other cooling fluid which circulates serially therethrough.

As mentioned heretofore, the slide 32 on the support 26 is likewise provided with a transformer and induction heater or inductor, similar to the transformer 34 and inductor 50, for cooperation with the way 13 of the casting 10. Since the inductors or heaters are shaped to substantially conform with the shape of the surfaces of the ways which are to be hardened and are continuously supplied with high frequency alternating current during the hardening operation, the surfaces of the ways are progressively heated to a hardening temperature as the machine tool casting is moved therepast during the feeding movement of the table 15. As is well known in the art, the depth of this heating depends upon a number of variables such as the frequency of the alternating current employed, the wattage thereof, the speed of movement of the article relative to the inductor, and the amount of separation or space between the article and the inductor. The present apparatus provides means for controlling each of these variables so that the heating is accurately controlled. Thus, rough adjustment of the separation or space between the ways and the inductors is effected by adjustment of the screws 24 and 25 and the finer, individual adjustment is effected by screws 30 and 31. Likewise, the frequency and the power output of the induction unit 35 are adjusted, to effect the desired heating, by means of the control knobs 41 and 41a. Also, the speed of feeding movement of the casting relative to the inductors is controllable by varying the speed of the motor 17 by means of a control knob which varies the resistance in the field and armature of the motor as hereinafter described. Consequently, the depth and degree of heating of the ways is accurately controlled and this heating of the ways is progressively effected as the casting moves relative to the inductors.

The apparatus of this invention further comprises a means for rapidly quenching the heated surfaces of the ways 13 and 14 substantially immediately after the latter have been heated to a hardening temperature. As shown, this is effected by providing a spray tube or tubes upon the trailing portions of the induction heaters or inductors. As will be seen in Figs. 3, 4 and 5 two such spray tubes are employed for each inductor and these tubes are mounted on the inductors for movement therewith. Thus, a hollow metallic tube 59 is welded or brazed to one trailing leg of the U-shaped portion 52 of the inductor 50, it being understood that hardening of the ways is effected when the casting 10 is moved in the direction indicated by the arrow A in Figs. 1 and 4. This tube 59 has one end closed and communicates adjacent the other end with a supply conduit 60 connected to a source of water or other quenching medium under pressure. The rear of the tube 59 is provided with a plurality of very fine spray openings such as 61, see Fig. 5, so that the water or other quenching medium supplied to the tube emerges therefrom in the form of a spray, the holes 61 being so directed that this spray impinges upon the surfaces of the way 14 which have just been heated. A second tube 62, similar to the tube 59, is brazed or welded onto the trailing leg of the U-shaped portion 53 of the induction heater. This tube 62 is likewise provided with a plurality of fine openings 63 on the rear side thereof and the tube is supplied with cooling water or other quenching medium under pressure through a conduit 64 connected to the tube 62 adjacent one end thereof, the other end of the tube being closed. While two separate tubes 59 and 62 have been shown, it will be understood that these may be united as a single tube if desired.

The construction is such that, as the induction heater progressively raises the temperature of the way while the latter is moved therepast, water or other quenching medium, which is continuously sprayed through the openings 61, 63 of the tubes 59, 62, immediately thereafter quenches the heated surfaces. The inductor for the way 13 is provided with similar spray tubes or tube so that both ways are simultaneously progressively heated to a hardening temperature and quenched as the casting 10 is moved beneath the inductors and quenchers by operation of the motor 17.

Figure 6:
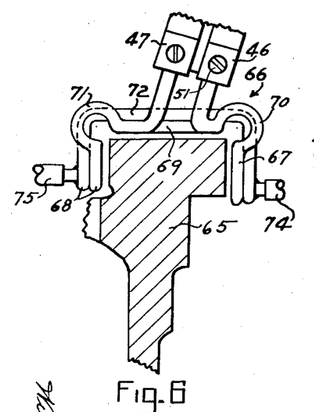
Fig. 6 is a fragmentary view showing a modified form of the induction-type heater and quencher in front elevation and cooperating with a way of configuration different from that illustrated in Figs. 2 through 5, a portion of the way being shown in section.
Figure 7:
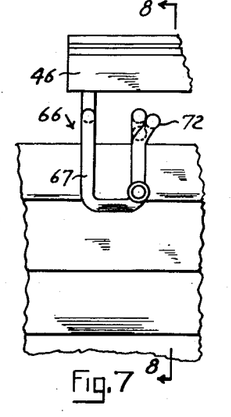
Fig. 7 is a fragmentary, side elevational view of the heater and quencher illustrated in Fig. 6.

When the ways which are to be hardened are substantially rectangular in cross section, such as that indicated at 65 in Figs. 6, 7 and 8, the above described apparatus may be readily adapted for cooperation with such ways by simply replacing the induction heaters and their attached quenching tubes by others of suitable configuration. This is easily effected since it will be remembered that the terminals of each of the induction heaters or inductors, such as 50, are slidably received in transverse bores in the forwardly extending portions 46, 47 of the bracket members 44, 45 and are retained therein by set screws or the like such as 51. Consequently, the inductors such as 50, and their attached quenching tubes, may be readily removed by simply loosening the screws 51 and pulling downwardly upon the inductors, it being understood that the flow of cooling fluid and quenching medium is terminated prior to this removal. After the inductors such as 50 have been removed from the bracket members, induction heaters and quenching means of different configuration are readily substituted therefor by reversing the operations performed in removing the inductors such as 50.

An inductor and quenching means suitable for cooperation with rectangularly shaped ways, similar to that designated 65, is shown in Figs. 6, 7 and 8. This inductor, which is designated generally as 66, comprises a single continuous copper tube, the ends of which are received in the transverse bores of the forwardly extending portions such as 46, 47, of the bracket members and are retained therein by set screws such as 51. Hence, this inductor is connected with the apparatus in the same manner as the inductor 50 and may be readily substituted therefor. The tube comprising the inductor 66 is bent to provide two substantially U-shaped portions 67 and 68, the planes of which are substantially parallel and spaced from each other for cooperation with the side surfaces of the way 65. These U-shaped portions 67 and 68 are connected by an intermediate portion 69 which extends over the top of the way and is substantially parallel therewith. It will be observed, however, that the conductor forming the heater, or inductor, 66 is provided adjacent the corners of the way 65 with outwardly curved portions or loops such as 70 and 71. This is to prevent excessive heating at the corners of the way as would occur if the conductor of the heater substantially conformed with the shape of these corners.

The heater or inductor 66 shown in Figs. 6, 7 and 8 is also provided with a quenching means for supplying a quenching fluid to the way 65 to the rear of the inductor 66. As shown in the drawings, this quenching means comprises a substantially U-shaped tube 72 which is attached to the trailing legs of the U-shaped portions 67, 68 of the heater by welding, brazing or the like, the bight of the U-shaped quenching means being integral with the side portions and extending over the top surface of the way. This quenching tube 72 is provided with a plurality of fine openings 73 upon the rear side thereof through which water or other quenching fluid is sprayed on the way, this water or other quenching fluid being supplied to the tube 72 through conduits such as 74 and 75 attached to the tube 72 adjacent the ends of the latter. An inductor and quenching means, similar to 66 and 72, is employed for each of the ways and operate in the same manner as previously described for the form of the heating and quenching means shown in Figs. 3, 4 and 5.

While but two forms of induction heaters or inductors and cooperating quenching means have been illustrated, it will be understood that heaters and quenchers of other configurations may be readily provided and employed with the illustrated apparatus when the ways to be hardened have configurations other than those herein shown. The inductors and quenchers, in each case, are preferably formed from copper tubing bent to substantially conform with the surfaces to be hardened and the inductors have their their terminals formed in the same manner as the inductors 50 and 66 so that they can be readily mounted in the bracket members of the transformers as previously described.

Figure 10:
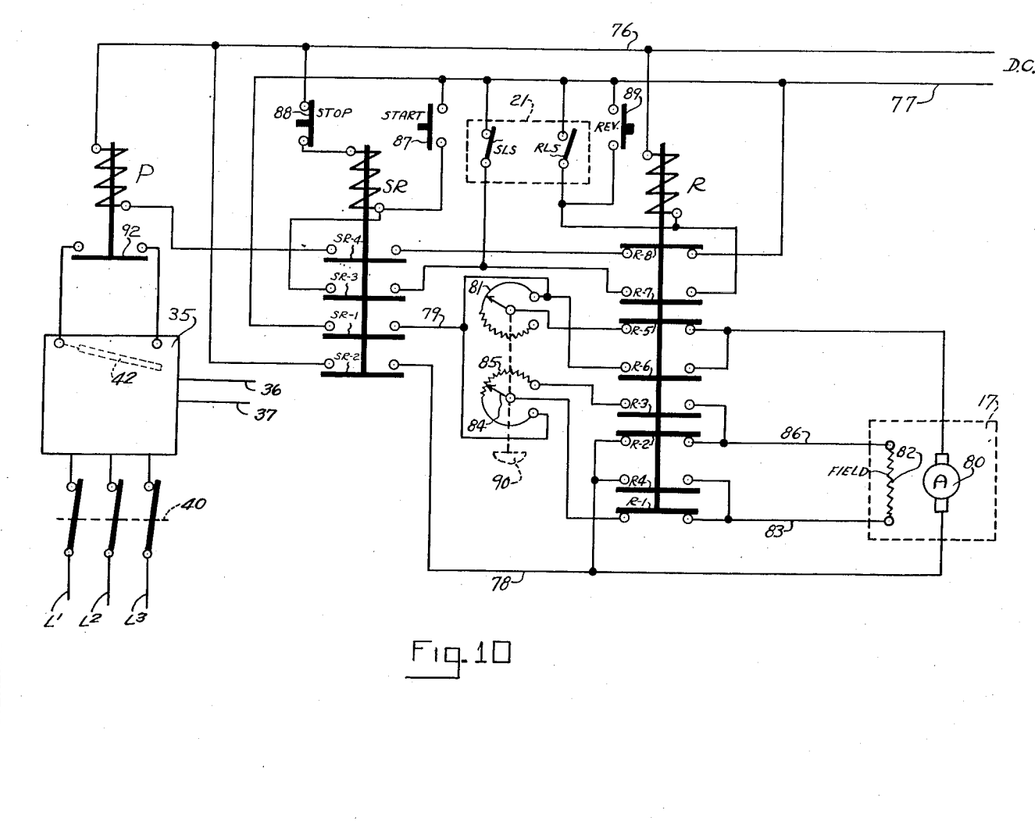

Figs. 9 and 10 schematically illustrate a simplified electrical circuit for controlling the operation of the apparatus. As shown, direct current is supplied to the wires 76 and 77 of the circuit, from an outside source of power, and these wires are connectible with the wires 78 and 79 through operation of the normally open contacts SR1 and SR2 of a relay SR. The motor 17, which is of the reversible, variable speed type, has one lead of its armature 80 connected to wire 78 and the other lead thereof connected with the wire 79 through the normally closed contacts R5 and a potential varying device 81 of the rheostat type. Normally open contacts R6 are bridged about the potential varying device or rheostat 81 and the contacts R5 so that the rheostat 81 is cut out or by-passed when the contacts R6 are closed.

The field 82 of the motor has one lead 83 thereof connected to the movable arm 84 of a potentiometer 85 through the normally closed contacts R1, the other lead 86 of the field being connected to the wire 78 through the normally closed contacts R2. The resistance portion of the potentiometer 85 has one terminal connected to the wire 79, the other terminal being connectible with lead 86 of the motor field through closing of the normally open contacts R3. The lead 83 of the motor field is also connectible with the wire 78 through operation of the normally open contacts R4.

The relay R, which is provided with, and operates, the previously mentioned contacts R1, R2, R3, R4, R5 and R6, has one lead connected to the wire 76 while the other lead of this relay is adapted to be connected with the wire 77 by closing of the normally open contacts RLS. These contacts RLS form a part of the switch means 21 operated by the movable table 15. A start switch 87 of the push button type is connected between the wire 77 and one lead of relay SR, the other lead of this relay being connected to wire 76 through a stop switch 88. The stop switch 88 is also of the push button type and is normally closed while the start switch is normally open. The start and stop switches are preferably located at a convenient position upon the standard 22 of the apparatus, see Fig. 1.

A holding circuit is provided around the start switch 87 by the normally closed contacts SLS, which are a part of the switch means 21, and by the normally open contacts SR3, the latter together with the contacts SR1 and SR2 being operated by relay SR. A holding circuit about the contacts RLS is also provided by the contacts SLS and the normally open contacts R7 of relay R.

In addition, a switch 89 is bridged about the contacts RLS to provide for manually effecting reversal of the direction of rotation of the motor prior to operation of the contacts RLS by the table 15.

The movable contact of the rheostat 81 and the arm 84 of the potentiometer 85 are connected together for simultaneous actuation by the single control knob 90 which is conveniently located upon the standard of the apparatus adjacent the start and stop switches, see Fig. 1. The rheostat 81 and the potentiometer 85 are so constructed that movement of the knob 90 in one direction simultaneously increases the potential applied to the armature 80 of the motor and decreases the potential applied to the field 82. Movement of the knob 90 in the opposite direction simultaneously decreases the potential applied to the armature and increases the potential applied to the field. The construction is such that, when contacts R1 and R2 are closed and contacts R3, R4 and R6 are open, the motor 17 operates in a forward direction at a relatively slow speed which is determined by the setting of the rheostat 81 and potentiometer 85. When the contacts R1, R2 and R5 are open and contacts R3, R4 and R6 are closed, however, the rheostat 81 is short circuited, the connections of the field 82 are reversed in the circuit and the full resistance of the potentiometer 85 is in series with the field so that the motor operates at a higher rate of speed and in the reverse direction.

A relay P is also connected between the wires 76 and 77 of the circuit in series with the normally open contacts SR4 of relay SR and the normally closed contacts R8 of relay R. Relay P is preferably located in a small auxiliary housing 91 attached to the housing of the induction unit 35 adjacent the manual "off—on" switch 42 of the latter. The relay P is provided with a movable contact 92 which is adapted, when relay P is energized, to provide a by-pass or bridge about the switch 42 so that, with the switch 42 in "off" position, the output of the induction unit may be controlled by the relay P.

The operation of the circuit, which has just been described, in controlling the apparatus will be apparent from the following summary of the operation of the apparatus.

Let it be assumed that the integral ways on the bed of a machine tool casting, such as that designated 10, are to be hardened to a known predetermined depth and that the casting has been supported upon the movable table 15 of the apparatus. The forward portions 46, 47 of the bracket members 44, 45 attached to each transformer, such as 34, are then provided with a combined induction heater and quencher having a configuration substantially conforming with the surfaces of the adjacent way which is to be hardened. The supports 26, 27 are then horizontally adjusted upon the crossrail 23 to properly dispose each inductor and attached quencher over the corresponding way of the casting and the crossrail 23 is then lowered to dispose the inductors and quenchers adjacent the ways. Individual adjustment of the separation of each inductor and quencher from the corresponding way is next effected, by means of the screws 30, 31. The stop 20 is adjusted into engagement with the switch means 21 and the stop 19 is positioned so that the distance between it and the switch means 21 corresponds to the length of the way to be hardened.

The switch 40 is closed to energize the induction unit 35 and the control knobs 41, 41a of the unit are set to provide alternating current of the desired frequency and wattage to produce the necessary heating in the ways of the casting taking into account the separation of the inductors from the ways and the speed at which the casting is to be moved by the motor 17 relative to the inductors. The induction unit does not supply current to the heaters as yet, however, since the switch 42 is open and the relay P is deenergized so that contact 92 is in open position. These variable factors are selected in accordance with the desired depth of hardening and the characteristics of the material in the casting, adjustment of the speed of the motor being effected by suitable setting of the knob 90 which regulates the potentials applied to the armature and field of the motor 17. It should be observed that the closing of switch 40 does not result in immediate application of electrical current to the inductors since the switch 42 is in "off" position and the relay P is deenergized so that contact 92 is in open position thus interrupting the output of the induction unit.

With the apparatus thus adjusted, cooling water or other fluid is supplied to the conduit 55 and a quenching medium is supplied to the conduits 60 and 64. The operator then depresses the button of start switch 87. This closes the circuit through the relay SR energizing the latter thereby closing the contacts SR1, SR2, SR3 and SR4. The closing of the contacts SR1 and SR2 energizes the armature 80 of the motor through the rheostat 81 and the normally closed contacts R5 while the field of the motor is energized through the arm 84 of the potentiometer 85 and the normally closed contacts R1 and R2. Since the motor now has a resistance in series with its armature and particularly no resistance in series with its field, the motor is rotated at a relatively slow speed so that the table 15 and casting 10 are moved at a feeding rate relative to the heating and quenching means in the direction indicated by the arrow A.

The contacts SLS of the switch means 21 are held open so long as the latter is in engagement with the stop 20 and hence the operator holds the start switch depressed until the table has moved sufficiently to separate the stop 20 from the switch means 21 whereupon the contacts SLS close providing a holding circuit for relay SR through its now closed contacts SR3. The operator may then release the start button.

Simultaneously with the energization of the motor 17, the operation of the start button 87 has, by its energization of relay SR resulted in energization of relay P through the normally closed contacts R8 and the now closed contacts SR4. The energization of relay P causes the latter to move its contact 92 to circuit closing position thereby bridging switch 42 of the induction unit so that high frequency alternating current is supplied to the inductors.

As the ways 13, 14 move beneath the inductors at the relatively slow feeding rate, the high frequency alternating current supplied to the latter produces eddy currents in the ways which, together with the resulting alternations in the magnetic flux therein, rapidly heats the surfaces of the ways to the desired depth. As these heated portions pass from under the inductors, the quenching fluid flowing from the quenching tubes impinges thereon thus quenching the heated surfaces, this heating and quenching being progressively accomplished throughout the length of the ways.

When the table 15 has moved sufficiently so that the ways have been hardened throughout their entire length, or any predetermined portion thereof as selected by the initial adjustments of stops 19 and 20, the stop 19 engages the switch 21. This does not affect the contacts SLS so that the latter remains closed. The engagement of the stop 19 with the switch means 21 does, however, close the normally open contacts RLS thereby energizing relay R so that the latter opens its normally closed contacts R1, R2, R5 and R8 and closes its normally open contacts R3, R4, R6 and R7. Opening of the contacts R1, R2 and closing of contacts R3 and R4 reverses the energization of the field of the motor and introduces the full resistance of the potentiometer 85 in series therewith. Opening of contacts R5 and closing of contacts R6 results in energizing the armature 80 of the motor with full line voltage. Consequently, the motor is now rotated in the reverse direction and at high speed for returning the table 15, and the casting thereon, to the initial position.

The opening of contacts R8 has deenergized relay P thus discontinuing the supply of high frequency alternating current to the inductors simultaneously with the reversal of the direction of rotation of the motor thus obviating the danger of overheating of the ways at either the end portion of the length to be hardened or during the return movement of the casting. It should be observed, however, that the induction unit 35 remains energized and only its output is interrupted so that the unit is immediately prepared to deliver high frequency alternating current of the desired wattage as soon as relay P is again energized.

The closing of contacts R7 provides a holding circuit about the contacts RLS so that relay R remains energized throughout the return movement of the table and casting even though the contacts RLS open as soon as the stop 19 is moved from engagement with the switch means 21. The flow of water or other cooling medium to the conduit 55 and the supply of quenching medium to the conduits 60 and 64 may be either terminated or allowed to continue during the return movement of the table and casting as may be desired.

As previously mentioned, the table and casting are returned to the initial position at a rapid rate. When the table 15 has reached the initial or starting position, the stop 20 engages the switch means 21 opening the contacts SLS. This deenergizes the relays R and SR thus stopping the motor by the opening of the contacts SR1 and SR2. The control circuit is then in condition for a new operation of the apparatus, the various contacts being in their respective open or closed positions as indicated in Fig. 9. The casting whose ways have just been treated is then removed, and a new casting is placed upon the table 15 and the previously described operations are repeated.

If the new casting whose ways are to be hardened is identical with the prior casting no changes need be made in the prior adjustments. If, however, the shape of the ways on the new casting are different from those on the casting which has just been removed, the inductor and quenchers are replaced by others of suitable configuration by simply loosening the screws such as 51 and slipping the previously used elements from the brackets of the transformers, the new elements then being placed therein and the screws 51 retightened. The slides 32 and 33 of the supports 26 and 27 are then adjusted to provide the desired separation between the inductors and the ways, the stops 19 and 20 are adjusted for the desired length of travel of the casting and the apparatus is placed in operation, as previously described, by operating the start button 87.

If it be desired to stop the apparatus while the table is moving in either direction the operator simply operates the stop switch 88 momentarily. This deenergizes the SR relay thus opening the contacts SR1, SR2, SR3 and SR4. Consequently, the motor is stopped regardless of its direction of rotation. If the motor 17 was moving the table in the direction for effecting hardening of the ways, the supply of high frequency alternating current to the inductors is terminated simultaneously with the stopping of the table since the opening of contacts SR4 deenergizes relay P opening the contact 92. Hence, the ways are not heated while the table is stationary thus preventing overheating and/or burning of the ways. Hardening of the ways may be resumed by again operating the start button. In the event the table 15 was returning to its initial position, the operation of the stop button does not deenergize relay R and hence when the start button is again operated, the motor 17 is again energized for rapid return movement of the table and casting.

The reverse switch 89 enables the forward movement of table 15, that is, movement in the direction for effecting hardening of the ways of a casting, to be terminated and the table returned to its initial position at will. Thus, assuming that the table 15 is moving in a forward direction and the operator wishes to return it to starting position, he momentarily depresses the button of switch 89. This energizes the relay R and the circuit then operates in same manner as though the contacts RLS had been closed to terminate the supply of current to the inductors and energize the motor for rotation in reverse direction at high speed.

It will thus be apparent that the operator has full control over the apparatus and the ways of the casting cannot be overheated or burned if the operator stops or reverses the table movement when the table is moving in the forward direction and electrical current is being supplied to the inductors. This full control of the operation of the apparatus facilitates making test runs and adjustments and also enables the operator to employ the apparatus without the use of the stops 19 and 20. In the latter situation the apparatus is started by simply depressing start button 87 and when the desired length of the way or ways has been hardened the hardening is terminated and the table and casting returned to the starting position by operation of the reverse button 89. When the table and casting have returned to the initial position, the operator simply momentarily manually actuates the right-hand portion of the switch means 21, as viewed in Fig. 1, to momentarily open the contacts SLS thereby deenergizing relays R and SR.

It will be observed that a failure of the direct current power supply, which would stop the motor 17 and hence the movement of the table and casting, cannot result in overheating of the ways of the casting since the relay P would also be deenergized thus terminating the supply of alternating current to the inductors.

The mounting of the inductors and quenching means on the forwardly extending portions 46 and 47 of the bracket members 44 and 45 enables the entire length of the ways of a machine tool casting to be hardened even though the inner ends of the ways extend beneath an overhanging portion of the headstock of the casting. That is to say, the length of the forwardly extending portions 46 and 47 of brackets are preferably such that the inductors and quenching means can pass slightly beyond the inner ends of the ways before the forward end of the headstock of the casting abuts the transformers 34.

It will now be apparent that the illustrated and described apparatus effects hardening of the ways of a machine tool in a rapid and uniform manner not heretofore possible. Moreover, the depth of the hardening is readily adjustable, not only by varying the frequency and power of the induction unit and/or the speed of relative movement between the inductors and the ways, but also by the ability to effect a close adjustment of the separation between the inductors and the ways. Hence, for a given speed of relative movement between the ways and the inductors and a given frequency and power of the induction unit, the depth of hardening of the ways may be accurately controlled by simply adjusting the elevation of the slides of supports 26 and 27 thereby regulating the separation between the inductors and the ways. Also, for a given separation between the inductors and the ways, the depth of hardening may be controlled by adjusting the speed of the motor 17 which is effected by simply turning the knob 90. Moreover, the novel construction of the apparatus enables induction heaters of various configurations to be readily substituted so that the apparatus is quickly and easily adapted for hardening of ways of various configurations.

As mentioned heretofore, the relative longitudinal movement between the ways to be hardened and the induction heaters and quenchers may be effected either by moving the casting on which the ways are provided, as has been illustrated and described, or by moving the induction heaters and quenchers and holding the casting stationary. Moreover, the water or other fluid which is used for cooling the secondary of the transformer may also be employed for effecting quenching by suitable connections. Furthermore, it is to be understood that the control circuit for the apparatus has been illustrated in simplified form in Fig. 9 to facilitate the description and the conventional protective devices and similar expedients may be incorporated therein. Likewise, the circuit may be provided with a conventional time delay means or other expedient to insure that the outer ends of the ways are heated to the same extent as the other portions of the ways.

That is to say, the heat imparted to the way tends to flow therethrough in advance of the inductor and this heat is added to that imparted to a given portion of the way when the inductor is substantially directly thereover so that the maximum temperature of that portion of the way is a function of the quantity of heat imparted in both manners. As relative movement begins between the inductor and the way, however, the outer end of the way has not been "preheated" by conduction as are the subsequent portions of the way and, hence, if the relative movement is at the same speed throughout the heating operation the outer end of the way may not be raised to as high a temperature as the remainder of the way and hence will not be hardened quite as much. Compensation may be effected for this difference in heating by providing for a slower speed of the relative movement between the inductor and way during the initial portion of that movement, or a time delay may be effected between the time that the supply of electrical current to the inductor or inductors is initiated and the time when the relative movement between the inductors and the way begins, which time delay is adjustable to provide for the desired additional heating of the outer ends of the ways.

While the apparatus has been specifically disclosed as employed for hardening the ways of a machine tool, it will be readily apparent that it may also be employed for simply heat treating such ways, or similar articles, for the purpose of drawing the hardness, for annealing, or for like operations. For such uses it is only necessary to terminate the supply of quenching medium to the apparatus, the induction unit 35 being adjusted to provide the necessary output to effect the degree of heating desired.

Other modifications and variations in the constructions herein illustrated and described may be readily effected by those skilled in the art. Moreover, while the term "casting" has been used in referring to the machine tool bed whose ways are to be hardened, it will be readily apparent that the invention is not restricted to use with castings but may be employed with forgings. Consequently, the invention is not to be considered as limited to the exact details disclosed.

Having thus described my invention, I claim:

In an apparatus for hardening a way of a machine tool bed, the combination of means for supporting said bed, an inductor shaped to extend transversely of and substantially parallel with the surfaces of a way to be hardened on said bed, means including a transformer for supplying alternating electrical current of relatively high frequency to said inductor, means supporting said transformer closely adjacent the way to be hardened, clamping means carried by said transformer on the side thereof adjacent the way to be hardened and removably supporting said inductor in close proximity to the way, a reversible electric motor operatively connected to one of said supporting means for producing relative movement between said inductor and the way whereby the surfaces of the way are progressively heated to a hardening temperature, an electric circuit for controlling energization of said motor and the supply of electrical current to said inductor, electric switch means in said circuit operative when actuated to substantially simultaneously reverse the direction of rotation of said motor and terminate the supply of electrical current to said inductor, the said switch means being mounted on one of said supporting means, switch operating means adjustably mounted on the other of said supporting means for engagement with said switch means after a predetermined length of the way has been heated so that the inductor and way resume their initial relative positions without further heat treatment of the way, manually operable switch means in said circuit for effecting reversal of said motor and termination of the current supply to the inductor at any time while the way is being heated, and means in said circuit for varying the energization of said motor to thereby automatically increase the speed of said motor when the direction of rotation of the latter is reversed by operation of either of said switch means, whereby the return relative movement of the inductor and way is at a higher speed than the relative movement in the direction in which the way is heated.

JAMES D. WILLIAMS.

REFERENCES CITED

The following references are of record in the file of this patent:

UNITED STATES PATENTS

| Number | Name | Date |
| --- | --- | --- |
| 2,138,811 | Abe | Dec. 6, 1938 |
| 2,238,082 | Somes | Apr. 15, 1941 |
| 2,281,297 | Somes | Apr. 28, 1942 |
| 2,288,035 | Somes | June 30, 1942 |
| 2,338,496 | Denneen et al. | Jan. 4, 1944 |
| 2,425,751 | McGuire, Jr. | Aug. 19, 1947 |
| 2,428,303 | Wood | Sept. 30, 1947 |
| 2,463,669 | Wright | Mar. 8, 1949 |
| 2,493,950 | Dow et al. | Jan. 10, 1950 |

FOREIGN PATENTS

| Number | Country | Date |
| --- | --- | --- |
| 435,343 | Great Britain | Sept. 19, 1935 |
| 520,629 | Great Britain | Apr. 30, 1940 |

OTHER REFERENCES

Babat: "Construction of Heating Coils for Induction Surface Hardening," Heat Treating and Forging, March 1941, pages 137, 138 and 139. Page 138 relied on.

Curtis, High Frequency Induction Heating, first edition, 1944. (McGraw-Hill), pages 18, 19, 46, 74, 75 and 179.

Metal Progress, December 1944, page 1337.